(12) United States Patent  
Skov et al.

(10) Patent No.: US 9,345,015 B2  
(45) Date of Patent: May 17, 2016

(54) METHOD AND APPARATUS FOR RE-INTERPRETING CHANNEL STATE INFORMATION

(75) Inventors: Peter Skov, Beijing (CN); Timo Erkki Lunttila, Espoo (FI); Frank Frederiksen, Klarup (DK); Klaus Hugl, Vienna (AT)

(73) Assignee: Nokia Technologies Oy, Espoo (FI)

( * ) Notice: Subject to any disclaimer, the term of this patent is extended or adjusted under 35 U.S.C. 154(b) by 91 days.

(21) Appl. No.: 14/384,497

(22) PCT Filed: Mar. 23, 2012

(86) PCT No.: PCT/CN2012/072980
§ 371 (c)(1),
(2), (4) Date: Oct. 27, 2014

(87) PCT Pub. No.: WO2013/139044
PCT Pub. Date: Sep. 26, 2013

(65) Prior Publication Data
US 2015/0181567 A1    Jun. 25, 2015

(51) Int. Cl.
*G01R 31/08* (2006.01)
*H04W 72/04* (2009.01)
*H04L 1/00* (2006.01)
*H04B 7/06* (2006.01)
*H04W 24/10* (2009.01)
(Continued)

(52) U.S. Cl.
CPC ........... *H04W 72/042* (2013.01); *H04B 7/0626* (2013.01); *H04B 7/0632* (2013.01); *H04L 1/0003* (2013.01); *H04L 1/0026* (2013.01); *H04W 24/10* (2013.01); *H04L 1/0009* (2013.01)

(58) Field of Classification Search
None
See application file for complete search history.

(56) References Cited

U.S. PATENT DOCUMENTS 7,333,560 B2 * 2/2008 Jalali .................... H04B 7/0434
375/285
9,049,618 B2 * 6/2015 Guo ...................... H04L 5/0096
(Continued)

FOREIGN PATENT DOCUMENTS

CN    102035615 A    4/2011
CN    102064920 A    5/2011
(Continued)

OTHER PUBLICATIONS

International Search Report and Written Opinion received for corresponding Patent Cooperation Treaty Application No. PCT/CN2012/072980, dated Dec. 6, 2012, 10 pages.

*Primary Examiner* — Anh Ngoc Nguyen
(74) *Attorney, Agent, or Firm* — Nokia Technologies Oy (57) ABSTRACT

A method and apparatus for re-interpreting channel state information are provided, which relate generally to wireless communications, and more specifically are directed toward the use of channel state information/channel quality indications in a wireless network. The apparatus includes at least one processor and at least one memory including computer program code. The at least one memory and the computer program code are configured, with the at least one processor, to cause the apparatus to perform at least the following: receive from a user equipment correspondence information that relates channel states of a first set to channel states of a second set (302); receive from the user equipment an indication of at least one channel state of the first set which was measured on a downlink (304); use the received indication of at least one channel state of the first set and the received correspondence information to determine a channel state from the second set (306); and adapt a transmission on a downlink channel for the user equipment using the determined channel state (308).

20 Claims, 7 Drawing Sheets

(56) References Cited

U.S. PATENT DOCUMENTS

2009/0147865 A1 6/2009 Zhang et al.
2009/0190528 A1* 7/2009 Chung ................ H04B 7/0417
370/328

FOREIGN PATENT DOCUMENTS

| CN | 102291225 A | 11/2011 |
|---|---|---|
| WO | 2011034021 A1 | 3/2011 |

* cited by examiner

Figure 1

| CQI index | modulation | code rate x 1024 | efficiency | E-PDCCH CSI index (aggregation level) |
|---|---|---|---|---|
| 0 | - | - | - | 4 |
| 1 | QPSK | 78 | 0.1523 | 4 |
| 2 | QPSK | 120 | 0.2344 | 4 |
| 3 | QPSK | 193 | 0.3770 | 2 |
| 4 | QPSK | 308 | 0.6016 | 2 |
| 5 | QPSK | 449 | 0.8770 | 2 |
| 6 | QPSK | 602 | 1.1758 | 2 |
| 7 | 16QAM | 378 | 1.4766 | 2 |
| 8 | 16QAM | 490 | 1.9141 | 2 |
| 9 | 16QAM | 616 | 2.4063 | 2 |
| 10 | 64QAM | 466 | 2.7305 | 1 |
| 11 | 64QAM | 567 | 3.3223 | 1 |
| 12 | 64QAM | 666 | 3.9023 | 1 |
| 13 | 64QAM | 772 | 4.5234 | 1 |
| 14 | 64QAM | 873 | 5.1152 | 1 |
| 15 | 64QAM | 948 | 5.5547 | 1 |

Figure 2A

| PDSCH CQI index | E-PDCCH CSI index (aggregation level) |
|---|---|
| 0 | 4 |
| 1 | 4 |
| 2 | 4 |
| 3 | 2 |
| 4 | 2 |
| 5 | 2 |
| 6 | 2 |
| 7 | 2 |
| 8 | 2 |
| 9 | 2 |
| 10 | 1 |
| 11 | 1 |
| 12 | 1 |
| 13 | 1 |
| 14 | 1 |
| 15 | 1 |

Figure 2B

| PDSCH CQI index | E-PDCCH modulation | E-PDCCH CSI index (aggregation level) |
|---|---|---|
| 0 | QPSK | 4 |
| 1 | QPSK | 4 |
| 2 | QPSK | 4 |
| 3 | QPSK | 2 |
| 4 | QPSK | 2 |
| 5 | QPSK | 2 |
| 6 | QPSK | 2 |
| 7 | QPSK | 2 |
| 8 | QPSK | 2 |
| 9 | QPSK | 2 |
| 10 | QPSK | 1 |
| 11 | QPSK | 1 |
| 12 | QPSK | 1 |
| 13 | 16QAM | 1 |
| 14 | 16QAM | 1 |
| 15 | 16QAM | 1 |

METHOD AND APPARATUS FOR RE-INTERPRETING CHANNEL STATE INFORMATION

RELATED APPLICATION

This application was originally filed as Patent Cooperation Treaty Application No. PCT/CN2012/072980 Mar. 23, 2012.

TECHNICAL FIELD

This invention relates generally to wireless communications, and more specifically is directed toward the use of channel state information/channel quality indications in a wireless network.

BACKGROUND

In cellular wireless systems channel state information is used for adaptation of the wireless link in order to more efficiently utilize the available bandwidth. For example if a channel is noisy it may only support a smaller transport block size and/or modulation and coding schemes that offer less data throughput as compared to the channel being less noisy, assuming there is a minimum performance metric (such as for example block error rate) as is the case with most cellular technologies. Channel state information is used generically and encompasses but is not limited to specific measures such as channel quality indication (CQI), precoding matrix indicator (PMI), rank indicator (RI), and the like.

In further advancements of the evolved universal terrestrial radio access network (E-UTRAN, also termed long term evolution LTE or 4G) there is research into a new downlink control channel. Whereas legacy E-UTRAN systems use a physical downlink control channel PDCCH for sending scheduling information to the user equipments (UEs), there are discussions of utilizing an enhanced PDCCH (ePDCCH) for that scheduling information. The PDCCHs and ePDCCHs are to schedule for the UEs radio resources on one or more physical downlink or uplink shared channels (PDSCH or PUSCH) on which the UEs receive or send their respective substantive data.

The ePDCCH is being developed to be more flexible in connection to signaling overhead as compared to the legacy PDCCH. Channel state information represents control signaling overhead that takes away from the radio resources available for substantive data, and so is justified to the extent it enables greater efficiencies for the substantive data sent on the PDSCH for example. For example, in the downlink the LTE network access node eNodeB is not able to obtain the downlink channel quality of a UE directly by itself, and so the UE measures it and reports it to the eNodeB which then adapts its downlink signaling to maximize downlink throughput on the PDSCH given the downlink channel conditions reported by the UE.

There are discussions in the development of the LTE-Advanced system (which is expected to be incorporated into Release 11 of 3GPP) for new requirements for the channel state information reporting concerning the ePDCCH, both in terms of the reporting mechanisms and the associated signaling needed to support these. The teachings below may be employed to advantage in this context, but are not limited only to channel state information for the ePDCCH of the LTE-Advanced system and may be used with any other wireless radio technology which uses link adaptation.

SUMMARY

In a first exemplary aspect of the invention there is an apparatus which includes at least one processor and at least one memory including computer program code. The at least one memory and the computer program code are configured, with the at least one processor, to cause the apparatus to perform at least the following: receive from a user equipment correspondence information that relates channel states of a first set to channel states of a second set; receive from the user equipment an indication of at least one channel state of the first set which was measured on a downlink; use the received indication of at least one channel state of the first set and the received correspondence information to determine a channel state from the second set; and adapt a transmission on a downlink channel for the user equipment using the determined channel state.

In a second exemplary aspect of the invention there is a method which comprises: receiving from a user equipment correspondence information that relates channel states of a first set to channel states of a second set; receiving from the user equipment an indication of at least one channel state of the first set which was measured on a downlink; using the received indication of at least one channel state of the first set and the received correspondence information, determining a channel state from the second set; and adapting a transmission on a downlink channel for the user equipment using the determined channel state.

In a third exemplary aspect of the invention there is a computer readable memory storing a program of instructions which when executed by at least one processor cause an apparatus to perform: receiving from a user equipment correspondence information that relates channel states of a first set to channel states of a second set; receiving from the user equipment an indication of at least one channel state of the first set which was measured on a downlink; using the received indication of at least one channel state of the first set and the received correspondence information, determining a channel state from the second set; and adapting a transmission on a downlink channel for the user equipment using the determined channel state.

In a fourth exemplary aspect of the invention there is an apparatus that comprises input means and determining means. The input means is for receiving from a user equipment correspondence information that relates channel states of a first set to channel states of a second set, and for receiving from the user equipment an indication of at least one channel state of the first set which was measured on a downlink. The determining means is for using the received indication of at least one channel state of the first set and the received correspondence information to determine a channel state from the second set. The control means is for adapting a transmission on a downlink channel for the user equipment using the determined channel state. By example, the input means may be a radio receiver and the determining means may be one or more processors.

In a fifth exemplary aspect of the invention there is an apparatus which includes at least one processor and at least one memory including computer program code. The at least one memory and the computer program code are configured, with the at least one processor, to cause the apparatus at least to: create and send correspondence information that relates channel states of a first set to channel states of a second set, where the second set is for a downlink channel; and measure at least one channel state and send an indication of the at least one channel state which is within the first set.

In a sixth exemplary aspect of the invention there is a method which comprises: creating and sending correspondence information that relates channel states of a first set to channel states of a second set, where the second set is for a downlink channel; and measuring at least one channel state and sending an indication of the at least one channel state which is within the first set.

In a seventh exemplary aspect of the invention there is a computer readable memory storing a program of instructions which when executed by at least one processor cause an apparatus to perform: creating and sending correspondence information that relates channel states of a first set to channel states of a second set, where the second set is for a downlink channel; and measuring at least one channel state and sending an indication of the at least one channel state which is within the first set.

In an eighth exemplary aspect of the invention there is an apparatus that comprises processing means and measuring means. The processing means is for creating and sending correspondence information that relates channel states of a first set to channel states of a second set, where the second set is for a downlink channel. The measuring means is for measuring at least one channel state and sending an indication of the at least one channel state which is within the first set. By example, the processing means may be one or more processors, and the measuring means may be that same or a different processor(s) operating in conjunction with measurement data obtained by a radio receiver for measuring a channel.

DETAILED DESCRIPTION

In conventional LTE, the definition of channel quality information (CQI) is such that it indicates the highest supported transport block size (TBS)/modulation and coding scheme (MCS), assuming that the eNodeB schedules data to the UE using the parameters the UE has reported to it. The UE shall derive for each CQI value reported in uplink subframe n the highest CQI index between 1 and 15 in the predefined CQI table such that the block error rate (BLER) of the physical downlink shared channel (PDSCH) data scheduled by the eNodeB according to the recommended CQI shall not exceed 10%.

Relevant teachings concerning CSI reporting that may have some relevance to the ePDCCH may be seen in co-owned PCT Application PCT/CN2012/070689 filed on Jan. 20, 2012.

When the ePDCCH is introduced for the LTE-Advanced system, CSI needed for optimized ePDCCH transmission could be different, and needed at different times, than what is used for the PDSCH in conventional LTE. In LTE-Advanced the PDSCH may be on a different component carrier than the ePDCCH and may be widely spaced in frequency therefrom. Therefore the implicit assumption in conventional LTE that the channel conditions observed by the UE for the PDSCH are sufficiently valid for the PDCCH is not reasonable to simply extend to the ePDCCH.

Figure 1:
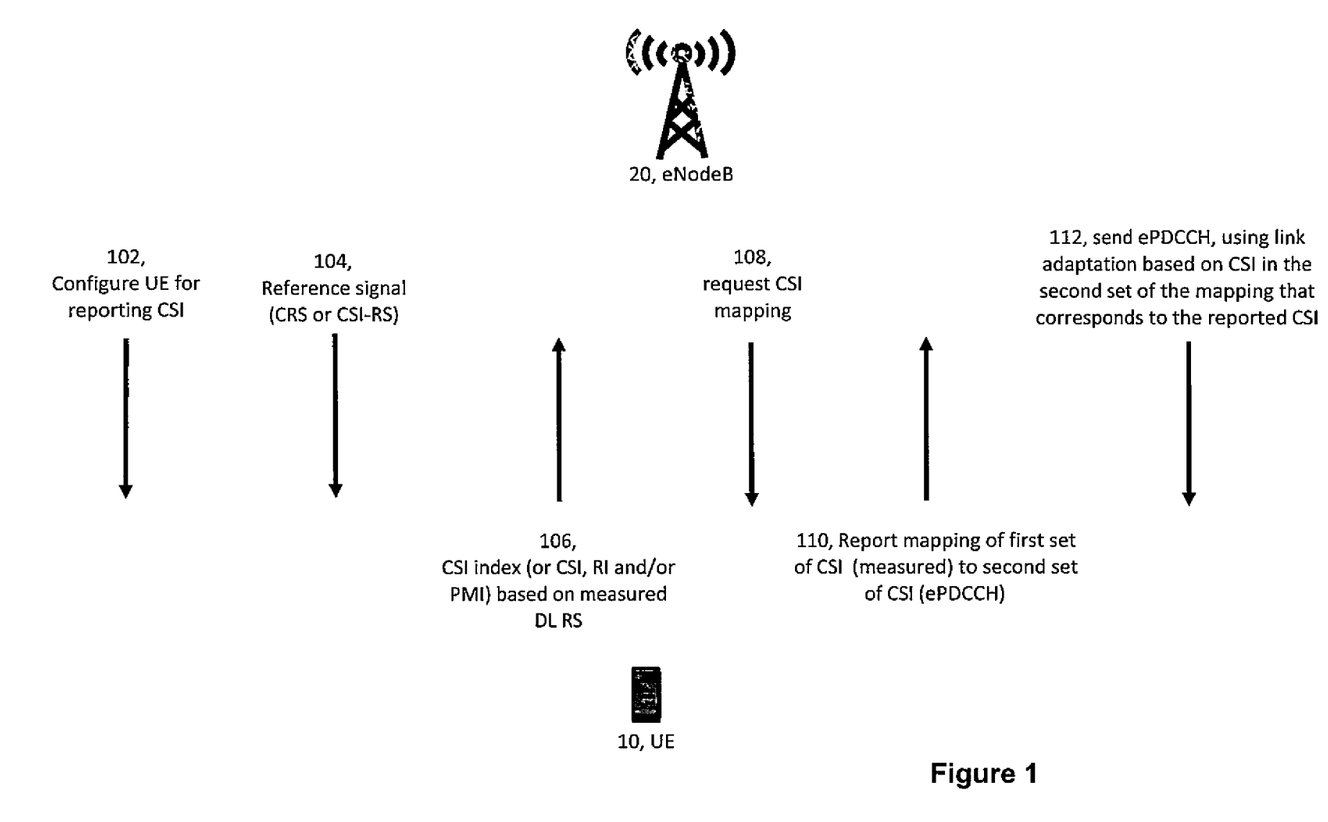
FIG. 1 is a schematic signaling diagram illustrating an overview of signaling in the E-UTRAN system according to the non-limiting examples set forth herein.
Figure 2A:
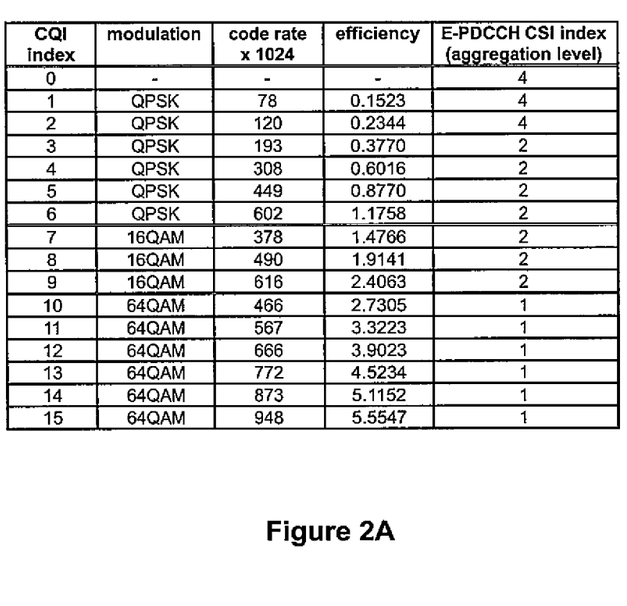
FIG. 2A-C are exemplary but non-limiting mappings of a first set of CQI indices to a second set of CQI indices for the ePDCCH according to one non-limiting example of these teachings.
Figure 2B:
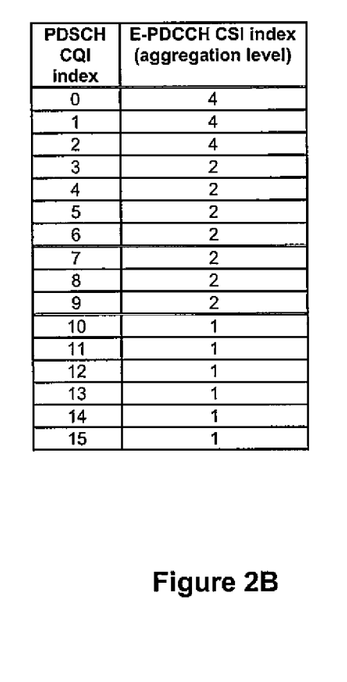
Figure 2C:
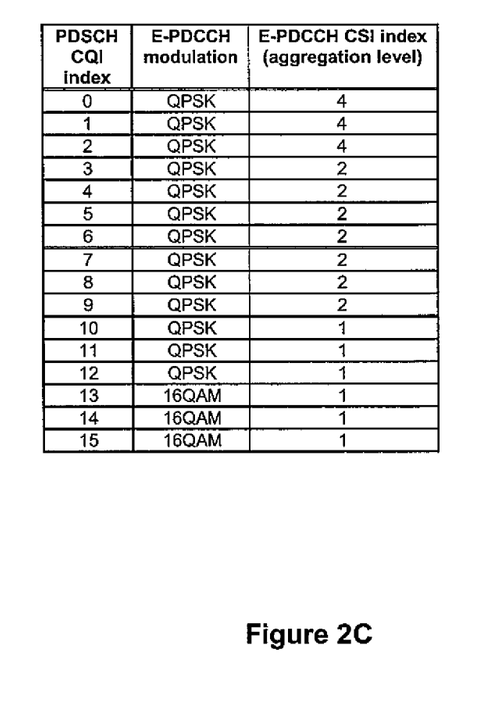

One non-limiting solution according to these teachings is shown at FIG. 1 in which the UE provides a proposed mapping of the CQI index for PDSCH which the UE 10 measures and reports an ePDCCH CQI index (which the UE 10 measured but did not explicitly report) so that the CQI index related to PDSCH that the UE reported can be used by the eNodeB for its link adaption concerning the ePDCCH. This mapping can be provided via uplink RRC signaling at the request 108 of the eNodeB 20 as shown in FIG. 1, or the UE can autonomously trigger this transmission whenever the mapping changes. FIGS. 2A-C show specific but non-limiting examples of such mapping.

Specifically, at FIG. 1 the eNodeB 20 first configures 102 the UE for reporting CSI. This configuring may be semi-static, as when 102 is radio resource control (RRC) signaling; or it may be dynamic as when 102 is a PDCCH that has an uplink resource grant for the UE 10. The eNodeB 20 then sends a downlink reference signal (RS) at 104. By example this reference signal may be a common reference signal (CRS), or it may be a RS specifically for measuring CSI for this UE (channel state information reference signal, CSI-RS). The UE 10 derives the CSI based on this RS 104 and reports at 106 the CSI for it. When reporting at 106 the UE 10 can report the CQI value, and/or a rank indicator (RI), and/or a precoding matrix indicator (PMI), or some indication of these actual values such as an index. While the UE 10 derives the CSI from the downlink RS, that CSI indicates to the eNodeB 20 the transmission parameters that the PDSCH should support.

As noted above, the eNodeB 20 may request the UE 10 to provide its mapping, depicted at FIG. 1 at 108. The UE 10 does so at 110, and as detailed below with reference to FIGS. 2A-C the UE 10 need not report the entire tables shown in those figures but may only signal the transitions. If we assume the measured CSI containing CQI on RSs is a first set of channel states, and the CSI that the UE 10 adds in its mapping as a second set of channel states (relevant for the ePDCCH in these examples), then what the UE 10 reports at 110 is correspondence information between the first set of channel states and the second set of channel states.

The order of the messages at FIG. 1 is not limiting. For example the UE 10 may report its mapping 110 prior to the time it derives and reports the CSI in step 106. This may save on signaling overhead for embodiments in which the UE 10 only sends a new mapping 110 to the eNodeB 20 when there is a change in the correspondence information between the first and second sets of channel states.

Then the eNodeB 20 uses that mapping from 110 and the reported (measured) CSI 106 of the first set of channel states (for the RS 104 which is related to the PDSCH) to obtain transmission parameters for the ePDCCH which is in the second set of channel states. This mapping is only suggested and the eNodeB 20 may use a different transmission parameters for the ePDCCH than was suggested in the mapping 110 by the UE 10, since for example it may receive from other UEs different mappings and decide a CQI for the ePDCCH that is more representative of all the UEs which have reported their suggested mapping. In any case the eNodeB 20 now has a CQI it can use for the ePDCCH, and adapts the link on which it sends the ePDCCH 112. Non-limiting examples of this link adaptation include using certain physical resource blocks (PRBs), aggregation levels and/or a transport block size and/or MCS and/or precoding in accordance with the mapped CQI which is in the second set.

FIG. 2A illustrates an example embodiment of a mapping the UE 10 might use to generate its suggested CSI mapping 110 at FIG. 1. In this example the first set of channel states is represented by the first column of FIG. 2A, which is the CQI index corresponding to what the UE measures from the RS related to the PDSCH, and which then UE 10 reports to the eNB 20 at message 106 as part of the CSI reporting. The second set is then the right-most column which has the CSI index (aggregation level) that the UE 10 suggests for the eNodeB's ePDCCH link adaptation. In an example embodiment, the UE 10 need not report this whole table, only the relevant index to aid the eNodeB 20 for its own downlink adaptation for the ePDCCH. For example, the UE 10 may only need to report where there is a transition of the index of the ePDCCH CSI, in order to save on control signaling overhead as compared to reporting all the indices in the leftmost and rightmost column in the table of FIG. 2A. In FIG. 2A those transition indices are 2 and 9. The eNodeB 20 will know those reported indices are the transitions and fill in the rest of its corresponding FIG. 2A table knowing there are no other transitions. In an exemplary embodiment the suggested CSI mapping 110 is sent to the eNodeB 20 via radio resource control (RRC) signaling.

Consider a specific example. Soon after attaching to the eNodeB, or when reporting neighbor cell measurements, the UE 10 will also report the ePDCCH CSI transition indices shown at FIG. 2A. The eNodeB 20 will then store in its memory the relevant information of FIG. 2A for this UE 10 (for example, the first and last columns of FIG. 2A are the relevant information; the second through fourth columns give details relevant to the first column). The UE 10 need not report its suggested mapping to this eNodeB 20 again unless it sees a change in its suggested mapping when the UE 10 measures the various RSs and ePDCCHs it receives over the time it is under control of this eNodeB 20.

When the UE 10 reports its CQI for RSs after the sequence shown at FIG. 1, the eNodeB 20 will already have the UE's suggested mapping information and use a) the UE's newly reported CQI index from a newly measured RS, and b) the UE's previously provided suggested mapping, to find the CSI index in the second set for the ePDCCH.

FIG. 2B illustrates an abbreviated form of FIG. 2A, showing only the two sets of channel states. When the eNodeB 20 receives a CSI index from the UE 10 relevant to PDSCH, the eNodeB 20 enters the FIG. 2B table at the left column (first set of channel states) with the reported index and finds the corresponding e-PDCCH CSI index in the right column (second set of channel states). As noted above, this is only a suggestion, but whether the eNodeB 20 adopts this suggestion or not, the UE's suggestion may still have some influence on the eNodeB's link adaptation of the ePDCCH. In an example embodiment, the UE's reporting (110 in FIG. 1) for the mapping shown at FIG. 2A-B is to report only that the transition indices are 2 and 9.

FIG. 2C illustrates another non-limiting example of the mapping table, but unlike FIGS. 2A-B there is 16QAM modulation in use for e-PDCCH for the FIG. 2C example, whereas in FIGS. 2A-B fixed QPSK modulation is assumed for e-PDCCH. As with FIGS. 2A-B, the left column represents the first set of channel states corresponding to the UE's reported CQI index for PDSCH, and the two right columns represent the second set of channel states that represent the UE's suggested CQI for the ePDCCH, containing varying modulation in the center column of FIG. 2C and varying aggregation level in the right column of FIG. 2C. In an example embodiment, the UE's reporting (110 in FIG. 1) for the mapping shown at FIG. 2C is to report only that the transition indices are 2, 9 and 12. In contrast to the example mapping in FIGS. 2A-B there is an additional transition (12) that needs to be indicated by changing from QPSK to 16QAM modulation for e-PDCCH in FIG. 2C. As the FIG. 2C example specifically illustrates, CQI index 2 is a transition between aggregation levels 2 and 4 for QPSK, CQI index 9 is a transition between aggregation levels 1 and 2 for QPSK, and CQI index 12 is a transition between QPSK and 16QAM modulation (both at aggregation level 1).

In another embodiment, instead of reporting only the transition indices the UE 10 will additionally indicate the coupling between the highest CQI index that would be supported at a given aggregation level. That is, in the example of FIG. 2A, the RRC message 110 generated in the UE would correspond to "Aggregation level 4 should be used when CQI index for PDSCH is lower than or equal to 2", and "Aggregation level 2 should be used when CQI index for PDSCH is lower than or equal to 9".

FIGS. 2A-C are only non-limiting examples. In case there is also higher order modulations in use beyond those shown at FIGS. 2A-C (for example, 64QAM), or if other possible transmissions are supported for the ePDCCH as well, those also may be included in a table similar in kind to that shown at FIGS. 2A-C, and indicated by the UE 10 similarly as the three different aggregation levels noted above as well as QPSK and 16QAM modulation. In this case also the UE 10 would still signal to the eNodeB 20 indications of the transition indices between those further eCSI states (the second set of channel states), but the relative additional overhead for this kind of signaling is relatively minimal since the UE's suggested mapping is not expected to change very rapidly (meaning these reports are expected to be relatively infrequent).

In another embodiment, for example if the CSI reported for the PDSCH (which lies in the first set of channel states and for which the UE 10 derives from the reference signal) indicates a supported transmission rank larger than one (that is, rank indicator RI>1), the CSI reported at 106 of FIG. 1 in this embodiment may contain two CQI values for the individual transport blocks of the LTE SU-MIMO (single-user multiple-input multiple-output). Also in this case, the information provided for example by any of FIGS. 2A-C is useful for the eNodeB 20 for the purpose of ePDCCH link-adaptation.

One example implementation of this rank indicator variation is for the eNodeB 20 itself to reinterpret the rank>1 CQI(s) for use with the ePDCCH, as detailed further below. Another example implementation is to extend any of the FIG. 2A-C table to include also eCSI interpretations conditioned on the rank, such as referring to the best signaled CQI for example.

An example implementation for the eNodeB 20 in this respect is for the eNodeB 20 to add up the efficiency of the transmission layers and map these to an equivalent single-stream CQI. So for example (using the CQI efficiency values from FIG. 2A) for RI=2, CQI#1=1 and CQI#2=2, the eNodeB 20 can compute the resulting efficiency as 0.1523+0.2344=0.3867 which is close to a single-stream CQI of 3. In this example using the values of FIG. 2A, the eNodeB 20 would use an aggregation level of 2 rather than aggregation level 4 which the layer-specific CQIs individually would imply. Note that for this type of calculation to be valid all of the efficiencies of all the layers, and not just of the transport blocks that may be shared between several layers, should be taken into account.

In another example embodiment for the eNodeB 20 it takes the efficiency of the codeword with the lower supported CQI (which is the more conservative option) or the codeword with the larger supported CQI (which is the more aggressive option) into account, and multiplies that by the number of supported layers given by the rank indicator RI. Using an example of RI=3 and CQI#1=4 and CQI#2=6, the values at FIG. 2A yield a calculated efficiency of 3*0.6016=1.8048 which for the conservative option result in an aggregation level of two. For the aggressive link-adaptation option, the calculation would be 3*1.1756=3.5268 which then results in an aggregation level of one.

In an example embodiment, whenever the rank indicator is greater than one the eNodeB 20 may use the lowest aggregation level and potentially a higher order modulation. In another example embodiment the eNodeB 20 may use the CQI to eCSI mapping (FIGS. 2A-C) for the case of SU-MIMO CSI with rank indicator greater than one.

From the above examples and with reference to FIGS. 2A-C it is clear that one technical advantage of these teachings is that no specific eCSI needs to be provided by the UE 10; instead the eNodeB re-interprets, with help from the UE 10, how to use the CQI for PDSCH (which in the above examples the UE measures from a RS) to generate the eCSI for the ePDCCH. This is useful when frequency selective CSI is used because the frequency selective properties are similar for PDSCH and E-PDCCH, and so this saves a non-negligible amount of control signaling bits for transmission over the uplink. The above example solutions are also a straightforward enhancement as compared to having no additional CSI information at all to support the ePDCCH.

Figure 3A:
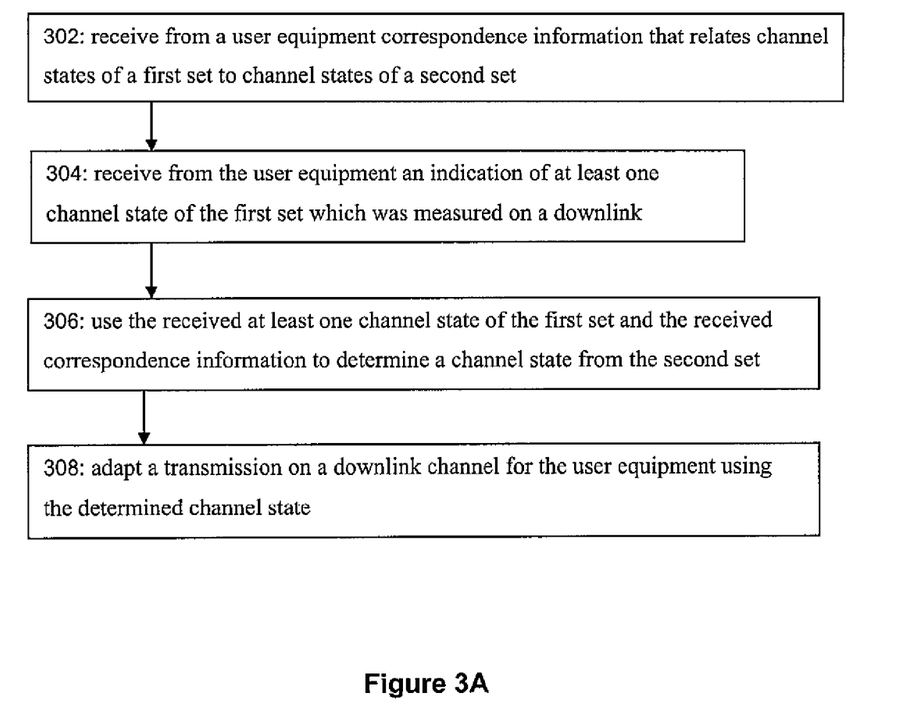
FIGS. 3A-B are logic flow diagrams that each illustrate from the perspective of the eNodeB and of the UE the operation of a method, and a result of execution by an apparatus of a set of computer program instructions embodied on a computer readable memory, in accordance with the exemplary embodiments of this invention.
Figure 3B:
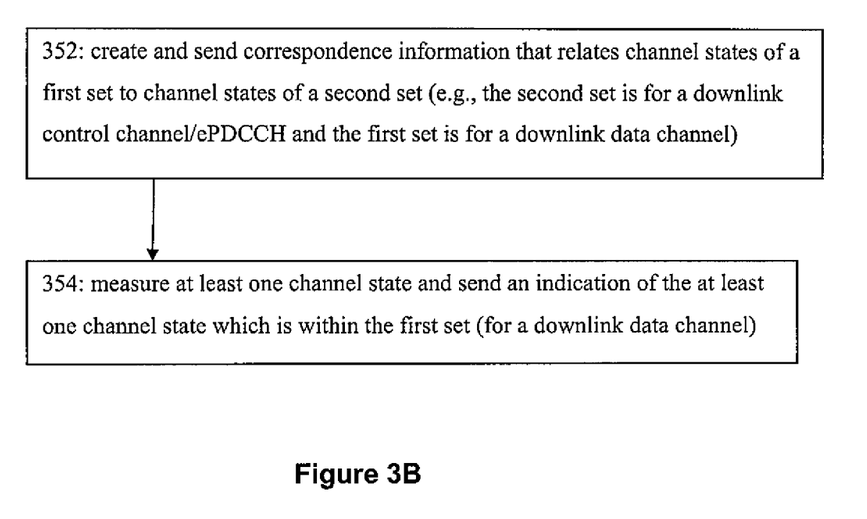

The logic flow diagram of FIG. 3A summarizes some of the non-limiting and exemplary embodiments of the invention from the perspective of the eNodeB 20 or certain components thereof if not performed by the entire eNodeB. Similarly FIG. 3B summarizes some of the non-limiting and exemplary embodiments of the invention from the perspective of the UE 10 or certain components thereof. These Figures may each be considered to illustrate the operation of a method, and a result of execution of a computer program stored in a computer readable memory, and a specific manner in which components of an electronic device are configured to cause that electronic device to operate, whether such an electronic device is the access node in full, the UE in full, or one or more components thereof such as a modem, chipset, or the like.

The various blocks shown at each of FIGS. 3A-B may also be considered as a plurality of coupled logic circuit elements constructed to carry out the associated function(s), or specific result of strings of computer program code or instructions stored in a memory. Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

At block 302 the eNodeB 20 receives from a UE correspondence information relating channel states of a first set to channel states of a second set. In the example above the correspondence information was the UE's reporting of the relevant information from its mapping table (FIGS. 2A-C), and there are multiple ways as detailed above by non-limiting example for exactly how the UE can report this information. In those examples the first set of channel states of block 302 was for the UE's measured PDSCH and the second set of channel states was the UE's suggestions for the ePDCCH, but these teachings are not limited only to the above specific examples.

At block 304 the eNodeB 20 receives also from the UE an indication of at least one channel state of the first set. This is the one which the UE measured on the downlink from a RS sent by the eNodeB. At block 306 the eNodeB uses the received indication of block 304 and the received correspondence information of block 304 to determine a channel state from the second set.

The eNodeB 20 then at block 308 adapts a transmission on a downlink channel for the UE using the determined channel state from block 306. In the above examples this downlink channel was a downlink control channel and the adapting the transmission may be done by adjusting any one or more of MCS, or aggregation level or size of the downlink control information (DCI, whose format gives the size of the PDCCH or ePDCCH) or in general the size of a payload, or precoding, or the PRBs the eNodeB uses for the ePDCCH, or other link adaptations known in the art.

As a further summary of the above examples in the context of FIG. 3A, recall that those examples indicated that the channel states of the first set were measured on reference signals sent by the eNodeB and refer to the channel state information of a physical downlink data channel such as the PDSCH sent by the eNodeB; the downlink control channel was an ePDCCH, and the indication of the channel state of the first set including an indication of an index of a CQI. In other embodiments there was a separate CQI index reported for each rank of the first set, and the channel state of the second set was determined as a single stream channel quality indication.

In another example the correspondence information comprises at least channel state transitions of a mapping between different channel states of the first set and different channel states of the second set. In a more specific example, for each rank of the first channel there is received a separate indication of the channel state of the first channel. The channel state of the second channel is determined as a relative single stream channel quality indicator; or the separate channel quality indication comprises a channel quality indication associated with a parameter of a codeword and the channel state of the second channel is determined by combining the parameters of the codewords associated with the separate channel quality indications of a number of supported layers given by the rank.

FIG. 3B illustrates certain non-limiting embodiments of these teachings from the perspective of the UE 10. At block 352 the UE 10 creates and sends correspondence information that relates channel states of a first set to channel states of a second set, where the second set is for a downlink channel and the first set is for a downlink data channel. Then at block 354 the UE 10 measures at least one channel state and sends an indication of the at least one channel state which is within the first set for a downlink data channel. In the specific examples above the channel state is measured on a RS and relates to the PDSCH; and further the downlink channel of block 352 (which in the above examples is more generally a downlink control channel) was an ePDCCH, and the indication of the at least one channel state of the first set indicates at least one index of a channel quality indication CQI.

Figure 4:
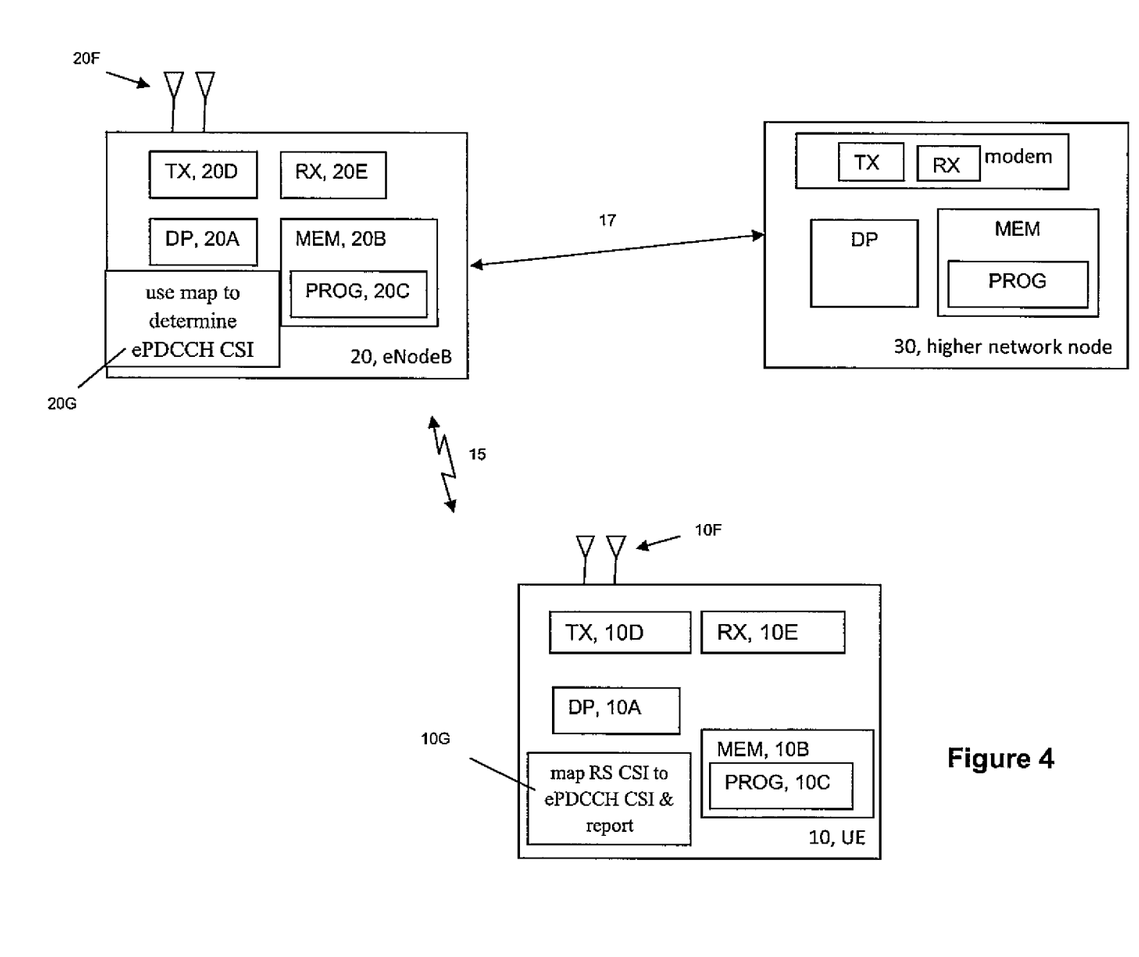
FIG. 4 is a simplified block diagram of an eNodeB and a UE which are exemplary devices suitable for use in practicing the exemplary embodiments of the invention.

Reference is now made to FIG. 4 for illustrating a simplified block diagram of various electronic devices and apparatus that are suitable for use in practicing the exemplary embodiments of this invention. In FIG. 4 an eNodeB 20 is adapted for communication over a wireless medium/link 15 with an apparatus, such as a mobile device/terminal or more generally a UE 10. FIG. 4 shows only one UE 10 but typically the eNodeB 20 will be handling multiple UEs. The eNodeB 20 may be any access node (including frequency selective repeaters) of any wireless network such as E-UTRAN in the examples above, or it may be an access node (Node B, base station, etc) that utilizes some other radio access technology such as for example cellular technologies GSM, GERAN, WCDMA, and the like which each use link adaptation that may be adapted according to these teachings to provide similar advantages. The eNodeB 20 provides the UE 10 with connectivity to further networks via data link 17 and the higher network node 30 (for example, a data communications network/Internet as shown and/or a publicly switched telephone network).

The UE 10 includes processing means such as at least one data processor (DP) 10A, and storing means such as at least one computer-readable memory (MEM) 10B storing at least one computer program (PROG) 10C or other set of executable instructions. In embodiments the UE 10 may also include communicating means such as a transmitter TX 10D and a receiver RX 10E for bidirectional wireless communications with the eNodeB 20 via one or more antennas 10F. Also stored in the MEM 10B at reference number 10G is the UE's algorithm or function or selection logic for creating the mapping between the CSI of PDSCH and the CSI on the ePDCCH as detailed above in various non-limiting examples.

The eNodeB 20 may comprise processing means such as at least one data processor (DP) 20A, storing means such as at least one computer-readable memory (MEM) 20B storing at least one computer program (PROG) 20C or other set of executable instructions. The eNodeB 20 may also comprise communicating means such as a transmitter TX 20D and a receiver RX 20E for bidirectional wireless communications with the UE 10, for example via one or more antennas 20F. The eNodeB 20 may store at block 20G the algorithm or function or selection logic for using the correspondence/mapping information it receives from the UE 10, as well as the CQI for the downlink that it also receives from the UE 10, to determine CQI on the ePDCCH for the purpose of link adaptation on the ePDCCH as set forth by non-limiting examples above.

At least one of the PROGs 20C/20G and in the eNodeB 20, and PROGs 10C/10G in the UE 10, is assumed to include a set of program instructions that, when executed by the associated DP 20A/10A, may enable the device to operate in accordance with the exemplary embodiments of this invention, as detailed above. In these regards the exemplary embodiments of this invention may be implemented at least in part by computer software stored on the MEM 10B, 20B which is executable by the DP 10A of the UE 10 and/or by the DP 20A of the eNodeB 20, or by hardware, or by a combination of tangibly stored software and hardware (and tangibly stored firmware). Electronic devices implementing these aspects of the invention need not be the entire devices as depicted at FIG. 4 but may be one or more components of same such as the above described tangibly stored software, hardware, firmware and DP, or a system on a chip SOC or an application specific integrated circuit ASIC.

In general, the various embodiments of the UE 10 can include, but are not limited to digital devices having wireless communication capabilities such as radio devices with sensors operating in a machine-to-machine type environment or personal portable radio devices such as but not limited to cellular telephones, navigation devices, laptop/palmtop/tablet computers, digital cameras and music devices, and Internet appliances.

Various embodiments of the computer readable MEMs 10B, 20B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 10A, 20A include but are not limited to general purpose computers, special purpose computers, microprocessors, digital signal processors (DSPs) and multi-core processors.

Various modifications and adaptations to the foregoing exemplary embodiments of this invention may become apparent to those skilled in the relevant arts in view of the foregoing description. Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

What is claimed is:

1. An apparatus comprising:
at least one processor; and
at least one memory including computer program code;
in which the at least one memory and the computer program code is configured, with the at least one processor, to cause the apparatus at least to:
receive from a user equipment correspondence information that relates channel states of a first set to channel states of a second set;
receive from the user equipment an indication of at least one channel state of the first set which was measured on a downlink;
use the received indication of at least one channel state of the first set and the received correspondence information to determine a channel state from the second set; and
adapt a transmission on a downlink channel for the user equipment using the determined channel state.

2. The apparatus according to claim 1, wherein the received indication of at least one channel state of the first set is for a physical downlink shared channel sent by the apparatus.

3. The apparatus according to claim 1, in which the downlink channel is an enhanced physical downlink control channel, and the received indication of the at least one channel state of the first set corresponds to a physical downlink shared channel and indicates at least one index of a channel quality indication CQI.

4. The apparatus according to claim 1, in which the received correspondence information comprises at least channel state transitions of a mapping between different channel states of the first set and different channel states of the second set.

5. The apparatus according to claim 1, in which for each rank of the first set there is received a separate indication of the channel state of the first set.

6. The apparatus according to claim 5, in which the channel state of the second set is determined as a single layer channel quality indication.

7. The apparatus according to claim 5, in which each separate channel quality indication for the first set comprises a channel quality indication associated with a parameter of a codeword associated with one of the channel quality indications of a number of supported layers given by the rank, and the channel state of the second channel is determined by combining the parameters of a number of supported layers given by the rank.

8. A method comprising receiving from a user equipment correspondence information that relates channel states of a first set to channel states of a second set;

receiving from the user equipment an indication of at least one channel state of the first set which was measured on a downlink;

using the received indication of at least one channel state of the first set and the received correspondence information, determining a channel state from the second set; and adapting a transmission on a downlink channel for the user equipment using the determined channel state.

9. The method according to claim 8, wherein the received indication of at least one channel state of the first set is for a physical downlink shared channel.

10. The method according to claim 8, in which the downlink channel is an enhanced physical downlink control channel, and the received indication of the at least one channel state of the first set corresponds to a physical downlink shared channel and indicates at least one index of a channel quality indication CQI.

11. The method according to claim 8, in which the received correspondence information comprises at least channel state transitions of a mapping between different channel states of the first set and different channel states of the second set.

12. The method according to claim 8, in which for each rank of the first set there is received a separate indication of the channel state of the first set.

13. The method according to claim 12, in which the channel state of the second set is determined as a single layer channel quality indication.

14. The method according to claim 12, in which each separate channel quality indication comprises a channel quality indication associated with a parameter of a codeword associated with one of the channel quality indications of a number of supported layers given by the rank, and the channel state of the second channel is determined by combining the parameters of a number of supported layers given by the rank.

15. A computer readable memory storing a program of instructions which when executed by at least one processor cause an apparatus to perform:

receiving from a user equipment correspondence information that relates channel states of a first set to channel states of a second set;

receiving from the user equipment an indication of at least one channel state of the first set which was measured on a downlink;

using the received indication of at least one channel state of the first set and the received correspondence information, determining a channel state from the second set; and adapting a transmission on a downlink channel for the user equipment using the determined channel state.

16. The computer readable memory according to claim 15, wherein the received indication of at least one channel state of the first set is for a physical downlink shared channel.

17. An apparatus comprising:

at least one processor; and at least one memory including computer program code;

in which the at least one memory and the computer program code is configured, with the at least one processor, to cause the apparatus at least to:

create and send correspondence information that relates channel states of a first set to channel states of a second set, where the second set is for a downlink channel; and measure at least one channel state and send an indication of the at least one channel state which is within the first set.

18. The apparatus according to claim 17, wherein the at least one channel state corresponds to a physical downlink shared channel.

19. The apparatus according to claim 17, in which the downlink channel is an enhanced physical downlink control channel, and the indication of the at least one channel state of the first set corresponds to a physical downlink shared channel and indicates at least one index of a channel quality indication CQI.

20. The apparatus according to claim 17, in which the sent correspondence information comprises at least channel state transitions of a mapping between different channel states of the first set and different channel states of the second set.

* * * * *